United States Patent [19]

(12) United States Patent
Wächter

(10) Patent No.: US 12,425,469 B2
(45) Date of Patent: Sep. 23, 2025

(54) SYSTEMS AND METHODS FOR INTELLIGENCE-ENHANCED VIDEO CONFERENCING

(71) Applicant: Arnd Wächter, Bo'ness (GB)

(72) Inventor: Arnd Wächter, Bo'ness (GB)

(*) Notice: Subject to any disclaimer, the term of this patent is extended or adjusted under 35 U.S.C. 154(b) by 4 days.

(21) Appl. No.: 18/140,836

(22) Filed: Apr. 28, 2023

(65) Prior Publication Data

US 2024/0364771 A1 Oct. 31, 2024

(51) Int. Cl.
*H04L 65/80* (2022.01)
*H04L 65/1093* (2022.01)
*H04L 65/401* (2022.01)
*H04L 65/403* (2022.01)

(52) U.S. Cl.
CPC .......... *H04L 65/80* (2013.01); *H04L 65/1093* (2013.01); *H04L 65/4015* (2013.01); *H04L 65/403* (2013.01)

(58) Field of Classification Search
CPC . H04L 65/80; H04L 65/1093; H04L 65/4015; H04L 65/403
See application file for complete search history.

(56) References Cited

U.S. PATENT DOCUMENTS

| | | | |
|---|---|---|---|
| 5,120,230 A | 6/1992 | Clark et al. | |
| 5,893,717 A | 4/1999 | Kirsch et al. | |
| 5,961,333 A | 10/1999 | Harrison et al. | |
| 11,706,269 B1* | 7/2023 | Hassan | H04L 12/1827 |
| | | | 709/204 |
| 11,789,837 B1* | 10/2023 | Jain | G16H 10/20 |
| | | | 709/224 |
| 2005/0164154 A1 | 7/2005 | Solomon | |
| 2006/0183100 A1 | 8/2006 | Voehl et al. | |
| 2009/0035733 A1 | 2/2009 | Meiter et al. | |
| 2014/0162234 A1 | 6/2014 | Ukelson | |
| 2018/0375676 A1* | 12/2018 | Bader-Natal | H04M 3/567 |
| 2021/0313077 A1* | 10/2021 | Smurro | G06N 3/08 |
| 2022/0086393 A1* | 3/2022 | Peters | H04N 7/147 |

* cited by examiner

*Primary Examiner* — Nicholas R Taylor
*Assistant Examiner* — Tania M Pena-Santana
(74) *Attorney, Agent, or Firm* — Condo Roccia Koptiw LLP

(57) ABSTRACT

Systems, methods, and instrumentalities may be disclosed for facilitating communication in virtual environments. A device (e.g., a video conference coordination server) may receive participant data from a participant device, and the participant data may include a diversity profile of a participant. The diversity profile of the participant may be calibrated based on one or more of a communication threshold or a communication practice list. The device may receive a conference administration dataset. The device may determine a location assignment of the participant based on one or more of the received participant data and the conference administration dataset. The device may determine an intervention data set to populate in a video conference room including the participant based on the location assignment, participant data, and the conference administration dataset.

14 Claims, 8 Drawing Sheets

SYSTEMS AND METHODS FOR INTELLIGENCE-ENHANCED VIDEO CONFERENCING

BACKGROUND

Video communication systems often fail to adequately address the complexities of human communication in itself and even more so their bridges to technology integration, resulting in limited participant engagement, ineffective communication, intercultural misunderstandings, avoidable conflicts, and suboptimal collaboration in virtual environments. Video conference participants may be more engaged with video conferencing if video communication systems offered a supportive infrastructure for facilitating task-oriented-but-human-centered, empathic, skilled, fair, diverse, and open dialogue, debate, engagement, and collaboration among all participants.

There is a need in the art for systems and methods for intelligence-enhanced video conferencing. Such intelligence-enhanced video conferencing may include IQ- and EQ-enhanced video conferencing, combining skills interventions that strengthen awareness of self and other, effective communication, and the like.

SUMMARY

Systems, methods, and instrumentalities may be disclosed for facilitating communication in virtual environments. The system may address challenges associated with scaled video conferences and harness the potential of both human communication and technology by incorporating a scaffolding of communication interventions within a video conferencing platform. These interventions are intentionally designed in order to create a highly effective and personal communication experience for participants that is easily scalable in diverse virtual settings.

In examples, participant data may be collected, and the participant data may focus on developing communication skills and promoting intentional interaction among the participants. This may be achieved by collecting data during a registration process. The registration process may form intentional groups based on factors (e.g., communication skill level, goals, personal background, culture, and diversity of individual participants). The collection of participant data may prepare participants for online communication by making participants aware of their personal (often unconscious) perception sources, interpersonal and intrapersonal factors, and communication choices that shape the basis, process and outcome of our human interactions. Participants may then be allocated into conference groups based on the collected participant data.

In examples, a peer leader may adjust virtual communication among the participants. The adjustment of virtual communication among the participants may correspond to a conference administration dataset. The peer leader may facilitate group formation and conference processes through interventions, such as, for example, to process and strengthen motivation, openness, self-awareness, other-awareness, intentionality and learning among participants. The peer leader may support levels of facilitation (e.g., small groups, workshop groups, and/or community groups, etc.), and/or offer training to equip participants (e.g., a select group of the participants) with the facilitation skills for effective guidance of diverse individuals and groups.

In examples, dialogue cues (e.g., communication cue elements) may facilitate active and intentional communication during the video conferencing session. The dialogue cues may include the use of interactive multimedia tools that support group dynamics, peer leadership, transformative learning, and community building. The dialogue cues may help participants in encoding and decoding communication elements in effective ways, such that, for example, the sender and receiver interpret communication cues in the same, similar or related ways. The dialogue cues may also help participants in promoting intentional pausing to reflect, growing capacities to integrate, translating insights into intentional perspective change and harnessing transformative learning towards new/refined behaviors and actions.

In examples, stages of the human and technology communication process may be supported. Interactive tools, AI-empowered communication steps, processes, and practices that enhance communication skills, foster intentional interaction, and enable transformative learning throughout the entire communication process may be provided. (*IQ+ EQ enhanced: combining skills interventions that strengthen: awareness of self and other, effective communication, etc.)

DETAILED DESCRIPTION

Figure 1:
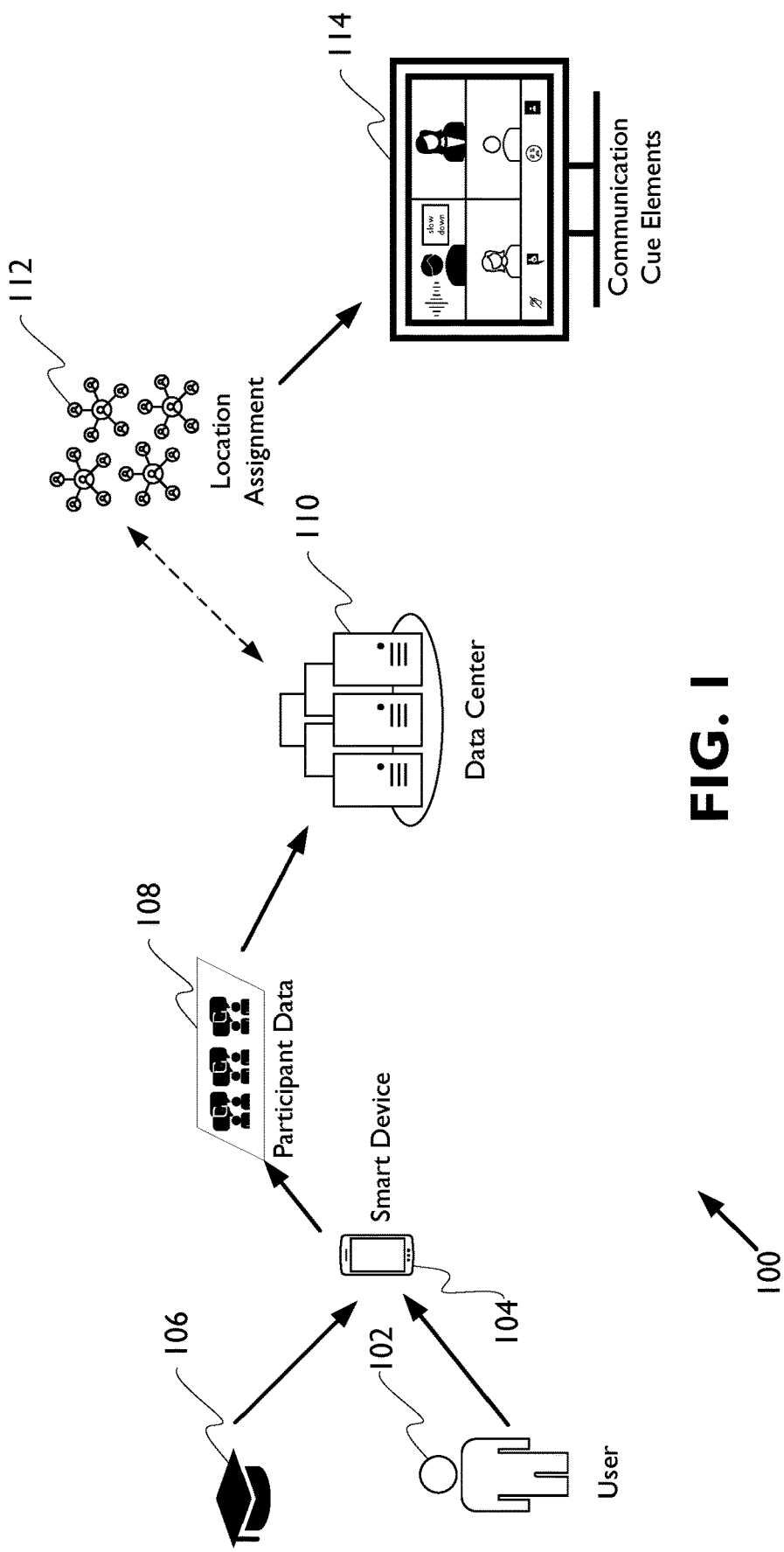
FIG. 1 is an example diagram of a system that may be used to collect participant data, determine participant location assignments, and/or determine dialogue cues.

FIG. 1 illustrates an example system 100 that may be employed for facilitating communication in virtual environments. The system 100 may facilitate the collection of participant data, the determination of participant location assignments, and/or the identification and implementation of dialogue cues. The system 100 may comprise a user 102, a smart device 104, a standardized education tool 106, participant data 108, a data center 110, a location assignment 112, and a communication cue element 114 (e.g., a communication cue element may be a type of intervention), which may be delivered on the Virtual Dialogue Console 'Human Bridges' (described below).

The user 102 may be a participant in a video conference and may interact with various components of the system 100 to modify a communication experience of a video conference (e.g., for the user and/or multiple users). The user 102 may provide information about themselves, such as a communication skill level, goals, personal background, culture, race, gender, orientation, etc., which may be utilized in creating a personalized and engaging video conferencing experience. The user 102 may provide information about a preferred language, time zone, accessibility requirement, and other factors that may influence their experience within the video conference. The user 102 may interface with a smart device 104.

The smart device 104 may be a type of electronic device that can facilitate participation of the user in the video conference. Examples of smart device 104 may include smartphones, tablets, laptops, desktop computers, smart displays, smart televisions, or wearable devices like smart glasses or smart watches. The smart device 104 may be equipped with a camera, microphone, and speaker for audio-visual communication, as well as software and hardware for connecting to the video conference platform. The smart device 104 may also have sensors, such as accelerometers, gyroscopes, and ambient light sensors that can provide context and input for the intelligent video conferencing system 100.

The smart device 104 may include an application for facilitating Intelligence-Enhanced Video Conferencing/IQ+EQ-Enhanced Video Conferencing. The smart device 104 may provide passive or active tracking and/or location services. The smart device 104 may collect data regarding the user 102, process data regarding the user 102, share data regarding the user 102, and/or store data associated with use of an application related to the video conferencing platform. The user 102 may have full transparency about the aims of collecting data and will have agency of choices throughout the dialogue process (before, during, after) about what level of data exposure and communication impulses the user 102 chooses. Participants may engage based on their particular skills level. For example, a system of so-called 'Black Belt Skill Levels' may be provided to determine what level of communication complexity participants are engaging on. User 102, for example, may choose the level they aim to engage on, and by that choose themselves the level of complexities, challenges and potential skill growth. The smart device 104 may use one of its sensors or processors to collect participant data 108 and may share the participant data 108 with a data center 110, or use it for catering the standardized education tool 106 to the user, etc.

The smart device 104 may provide a user interface. The smart device 104 may provide feedback and data related to the intelligent video conferencing experience. For example, the smart device may display a response to completing a pre-conference activity, or a list of activities that may be completed by the user 102. The smart device 104 may perform activity tracking (e.g., of the user's engagement in the video conference) and provide activity information (e.g., user's progress in achieving communication goals).

The standardized education tool 106 may be a web-based or standalone application that assists in the collection and analysis of participant data 108. The standardized education tool 106 may help users 102 assess and improve their communication skills through various modules (before, during and after the video conferencing), such as self-assessment questionnaires, interactive exercises, and multimedia content. The standardized education tool 106 may facilitate the creation of intentional groups based on factors such as communication skill level, goals, personal background, and culture, and/or factors that contribute to a video conferencing experience.

The participant data 108 may include information collected from the user 102 during a registration process, through the use of the standardized education tool 106, or via interaction with the user's smart device 104. The participant data 108 may include information about the user's communication skill level, goals, personal background, and culture, or factors such as preferred language, time zone, accessibility requirements, etc. The participant data 108 may be stored in a secure and encrypted format to protect privacy of the user and maintain compliance with applicable data protection regulations.

The data center 110 may be a centralized device that stores, processes, and manages the participant data 108. The data center 110 may be a cloud-based infrastructure or an on-premises facility, and may utilize various technologies, such as server virtualization, containerization, and distributed storage, to ensure scalability, reliability, and/or security. The data center 110 may utilize data analytics and machine learning algorithms to analyze the participant data 108, determine location assignments 112 and communication cue elements 114, and modify (e.g., continuously) the overall video conferencing experience.

A data center 108 may include server resources suitable for remote processing and/or storing of information. For example, the data center 108 may include a server, a cloud server, data center, a virtual machine server, and the like. In examples, the user 102 may communicate with the data center 108 via the smartphone 104. In examples, the smart device 104 may communicate with the data center 108 via its own wireless link. Hardware and wireless link capabilities of the data center may not be less than the hardware capabilities of the smart device 104. The wireless links used by the smart device 104 may include mobile wireless protocols, such as global system for mobile communications (GSM), 4G long-term evolution protocol (LTE), 5G, and 5G new radio (NR), and a variety of mobile Internet of things (IoT) protocols. The protocols may enable the smart device 104 to communicate readily, for example when a user is mobile, traveling away from home or office, and without manual configuration.

The location assignment 112 may refer to the allocation of users 102 into conference groups based on their participant data 108. This assignment may help to create communication environments by grouping users with similar communication skills, goals, personal backgrounds, and cultures together.

In examples, the activity of a user 102 may be monitored by the application. A communication pattern may be generated by the application for the user 102. Current communication activity of the user may be monitored to detect communication deviations from an established pattern of the user. When a deviation is detected, the system may send an alert message to the user 102 or another user indicating to the user that an anomaly has occurred or to continue use of the app, permitting the user to respond to the anomaly or enter the application for continued use. Deviations in the use of the application may be logged by the application.

Data corresponding to the use of the application may be logged to a data set corresponding to an engagement metric of the user, and the data corresponding to the use of the application may contribute in part to the engagement metric. In examples, a high engagement metric may result in the application notifying the user 102 to continue participating in the video conference and submit additional participant data 108. A low engagement metric may result in the application notifying the user 102 to return to the application and continue use of the application. In an example, a low engagement metric may result in the application notifying the user 102 with words of encouragement associated with continued use of the application.

One or more devices, such as smart device 104, may be installed in an environment of the user 102 to be used to monitor the user's communication activities and, e.g., contribute to the engagement metric and/or detect deviations from the user's communication pattern. For example, the user's engagement activity on the smart device 104. Similarly, the engagement activity on personal computers, laptop computers, and/or wireless devices may be monitored. By utilizing devices (e.g., content service/display/access devices) that may be installed at the location of the user to identify consistencies and inconsistencies in the activity of the user (e.g., including content consumption), the communication performance of the user may be monitored without installing additional monitoring equipment.

In an example, the monitoring may be performed by a gateway interface device, such as a modem or router, through which various other devices connect with one or more external networks. The gateway interface device may benefit from being in a centralized location within a data network of the environment of the user. In examples, monitoring software may be loaded into a modem memory and executed by a modem processor. The monitoring may be performed at one or more devices at a local office (e.g., a push server, content server, and/or application server, etc.), within a network, e.g., in a cloud network having distributed computing and/or data storage devices and/or functionalities, etc.

The application may provide prediction assessments when looking at demographics and other information, incorporating participant data 108, etc. Personalized recommendations may be provided for users 102, such as suggestions of what to be aware of (e.g., biases), what intention choices would serve this particular communication, what to do and what not to do during the video conference. The recommendations may entice users and help them understand how they may improve their communication skills (track their growth of skills and support integration and choice of new practices/behaviors/habits afterwards). In an example, users may be provided information on how conducting an intervention may help their communication performance later on. For example, if a user 102 practices active listening during a video conference, the ability of the user to effectively communicate and collaborate with others may improve over time.

Figure 2:
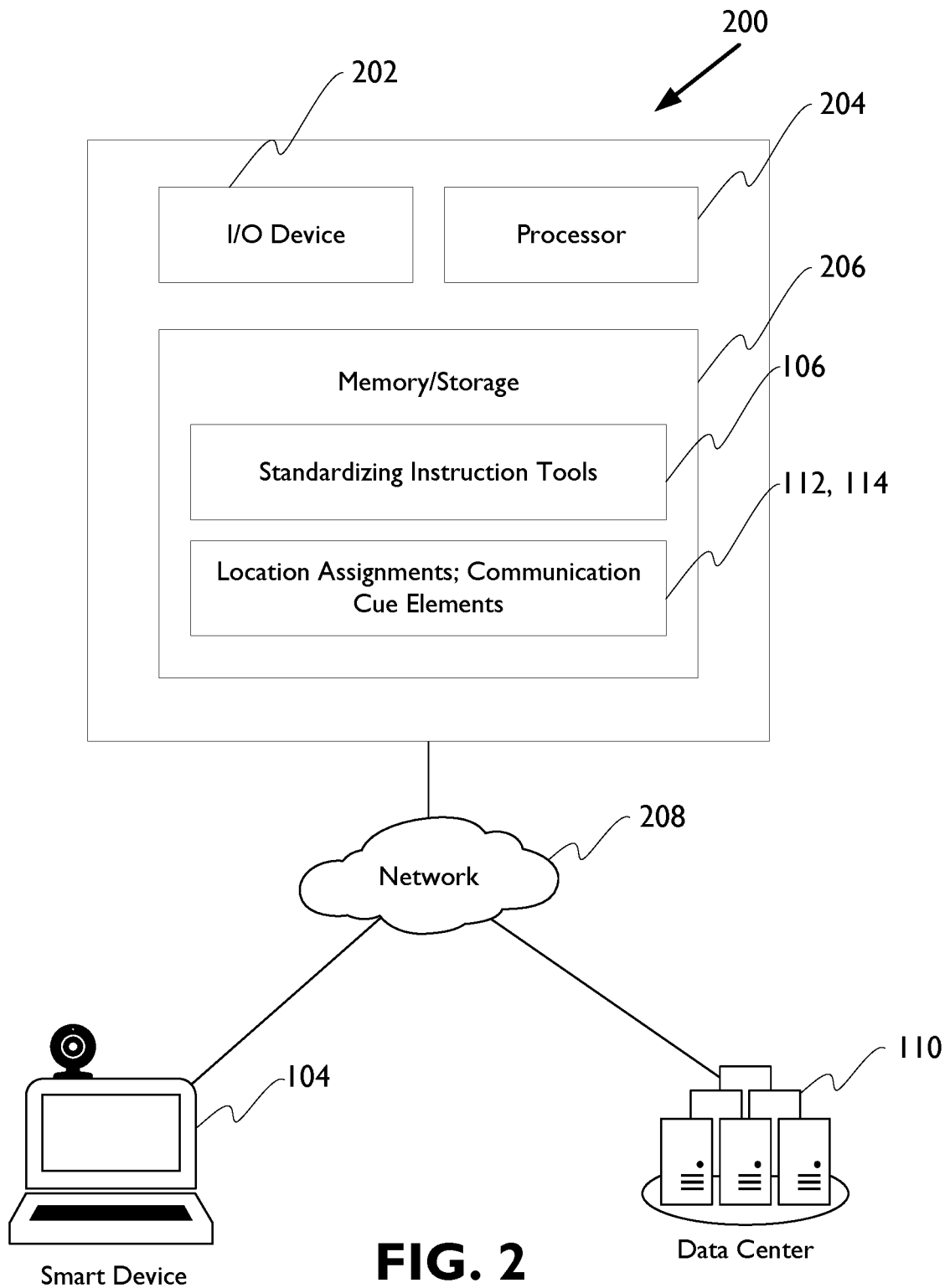
FIG. 2 is an example architecture diagram for an example system to support the collection of participant data and the determination of participant location assignments and/or dialogue cues.

FIG. 2 depicts an example architecture system 200 diagram for an example system to support the determination of intervention data sets.

The architecture system 200 may include an I/O device 202, processor 204, and/or a memory/storage 206. In an example, the I/O device 202 may include a disk controller having control registers, a flash controller, a controller for other high performance non-volatile storage devices, control registers, a PCIe controller having control registers, a network information controller having control registers, and/or a miscellaneous I/O device having control registers. In an example, the I/O device 202 may be an integrated I/O device or may be one or more external I/O devices. For example, each of the I/O devices may include a set of control registers. For example, the individual sets of control registers may include configuration information particular to the I/O device that the I/O device is a part of to enable the I/O device to function as programmed and desired.

In an example, the I/O device 102 may be a separate, self-contained component of the architecture system 200. The I/O devices may include the functions needed to perform their particular function including a set of functions that may be common to each of the I/O devices. In architecture system 200, the I/O devices may function as a self-contained component within the system. For example, the architecture system may include a shared I/O that is configured to have a set of shared functions. For example, the set of shared functions may not be included on individual I/O devices and may be removed from the I/O device 202. In an example, the I/O device 202 may interact with a shared I/O unit for use of the one or more of the set of shared functions. For example, the set of shared functions may be in a single location on the shared I/O device 202 for the components of the architecture system to use. In an example, the set of shared functions may be distributed across multiple locations.

The I/O device 202 may include a transmitter and receiver that enable wireless communications using any suitable communications protocol, for example, protocols suitable for embedded applications. For example, the transmitter and receiver may be configured to enable a wireless personal area network (PAN) communications protocol, a wireless LAN communications protocol, a wide area network (WAN) communications protocol, and the like. The transmitter and receiver may be configured to communicate via Bluetooth, for example, with any supported or custom Bluetooth version and/or with any supported or custom protocol, including for example, A/V Control Transport Protocol (AVCTP), A/V Distribution Transport (AVDTP), Bluetooth Network Encapsulation Protocol (BNEP), IrDA Interoperability (IrDA), Multi-Channel Adaptation Protocol (MCAP), and RF Communications Protocol (RFCOMM), and the like. In an example, the transmitter and receiver may be configured to communicate via Bluetooth Low Energy (LE) and/or a Bluetooth Internet of Things (IoT) protocol. The transmitter and receiver may be configured to communicate via local mesh network protocols such as ZigBee, Z-Wave, Thread, and the like. For example, such protocols may enable the transmitter and receiver to communicate with nearby devices such as the user's cell phone and/or a user's smartwatch. Communication with a local networked device, such as a mobile phone, may enable further communication with other devices across a wide area network (WAN) to devices remote, on the Internet, on a corporate network, and the like.

The transmitter and receiver may be configured to communicate via LAN protocols such as 802.11 wireless protocols like Wi-Fi, including but not limited to, communications in the 2.4 GHz, 5 GHZ, 6 GHz, and 60 GHz frequency bands. Such protocols may enable the transmitter and receiver to communicate with a local network access point, such as a wireless router in a home or office of the user, for example. Communication with a local network access point may enable communication with other devices present on the local network or across a WAN to devices remote, on the Internet, on a corporate network, and the like.

The transmitter and receiver may be configured to communicate via mobile wireless protocols such as global system for mobile communications (GSM), 4G long-term evolution protocol (LTE), 5G, and 5G new radio (NR), and any variety of mobile Internet of things (IoT) protocols. Such protocols may enable the transmitter and receiver to communicate more readily, for example when a user is mobile, traveling away from home or office, and without manual configuration.

The processor 204 in the architecture system 200 may comprise electronic hardware components such as multiple processors. As an example, the processor 204 might include a digital processing unit. The processor 204 could consist of microprocessors (e.g., single-core and multi-core), microcontrollers, digital signal processors (DSPs), field-programmable gate arrays (FPGAs), analog and/or digital application-specific integrated circuits (ASICs), or the like, or combinations thereof. The processor 204 may execute, process, or run instructions, code, code segments, software, firmware, programs, applications, apps, processes, services, daemons, etc. For instance, the processor 204 may execute software applications/programs like the standardizing instruction tools 106, location assignments 112, and communication cue elements 114, which could be stored in the memory storage 206. The processor 204 may include hardware components (e.g., finite-state machines, sequential and combinational logic) and other electronic circuits capable of performing the functions necessary for the operation of the current invention. The processor 204 may communicate with electronic components through serial or parallel links, including universal busses, address busses, data busses, control lines, etc.

The memory storage 206 in the architecture system 200 may comprise electronic hardware data storage components like read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In an example, the memory storage 206 may be embedded in, or packaged in the same package as, the processor 204. The memory storage 206 may include a computer-readable medium. The memory storage 206 may store the instructions, code, code segments, software, firmware, programs, applications, apps, services, daemons, or the like that are executed by the processor 204. In an example, the memory storage 206 may store software applications/programs/data, such as the standardizing instruction tools 106, location assignments 112, and communication cue elements 114. The memory storage 206 may also store settings, data, documents, sound files, photographs, movies, images, databases, and the like.

The network 208 may include a long-distance data network, such as a private corporate network, a virtual private network (VPN), a public commercial network, an interconnection of networks, such as the Internet, or the like. The network 208 may provide connectivity to the smart device 104 and the data center 110.

The network 208 may include server resources suitable for remote processing and/or storing of information. For example, the network 208 may include a server, a cloud server, the data center 110, external data centers that enable the functionality of the network, a virtual machine server, and the like. In an example, a smartwatch may communicate with the network 208 via its own wireless link, and the smart device 104 may communicate with the network 208 via its own wireless link.

Through hardware, software, firmware, or various combinations thereof, the processor 204 may—alone or in combination with other processing elements—be configured to perform the operations of examples described herein. Examples of the technology may be described in connection with the attached drawing figures. The examples are intended to describe the technology in sufficient detail to enable those skilled in the art to practice the technology. Changes may be made to the scheme of the processor without departing from the scope of the technology. The system may include additional, less, or alternate functionality and/or device(s), including those discussed elsewhere herein.

Figure 3:
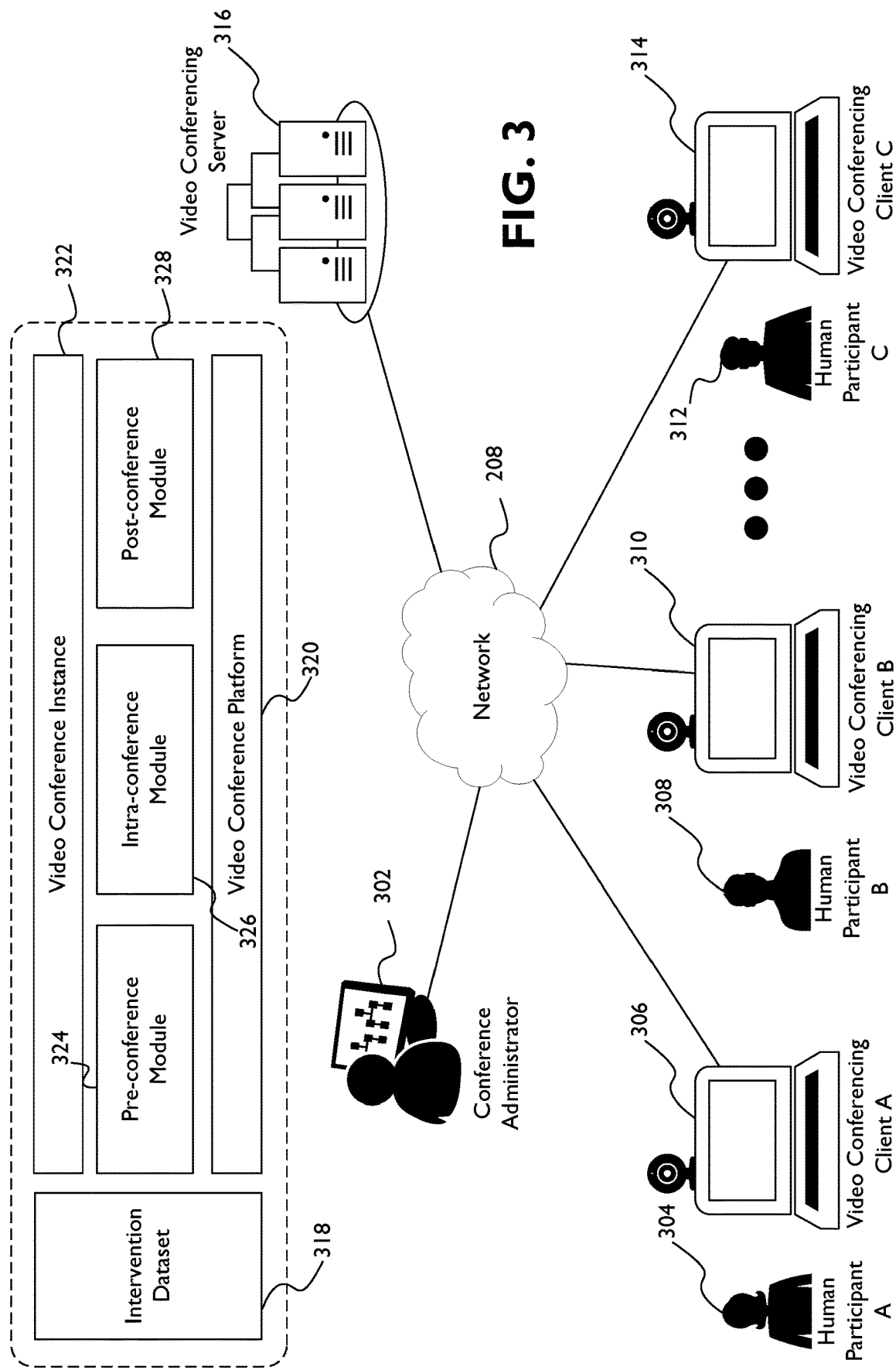
FIG. 3 is an example diagram of facilitating a video conference based on a video conference platform, a conference administrator, and video conferencing clients.

FIG. 3 presents an example diagram illustrating the facilitation of a video conference using a video conference platform, a conference administrator, and video conferencing clients. The diagram may include a network 208, which may be connected to a conference administrator 302, a video conferencing server 316, a human participant A 304 using video conferencing client A 306, a human participant B 308 using video conferencing client B 310, and a human participant C 312 using video conferencing client C 314 using the Virtual Dialogue Console.

The network 208 may serve as a communication backbone, and the network may enable connectivity and data exchange between components of the system. The network may include types of networks, such as private corporate networks, virtual private networks (VPNs), public commercial networks, interconnected networks like the Internet, or a combination of these.

The conference administrator 302 may be responsible for coordinating and managing the video conference. The conference administrator 302 may be a dedicated server, software application, or a combination thereof. The conference administrator 302 may handle tasks such as initiating the conference, inviting participants, managing participant access, controlling conference settings, and monitoring the conference progress. The conference administrator 302 may communicate with the video conferencing server 316 and the video conferencing clients 306, 310, and 314 via the network 208.

The conference administrator 302 may include an individual device (e.g., a device of a conference administrator) that is responsible for overseeing and managing the video conference. The conference administrator 302 may handle various tasks including initiating the conference, inviting participants, managing participant access, and monitoring the progress of the conference. Additionally, the conference administrator 302 may utilize the standardizing instruction tools 106, location assignments 112, and communication cue elements 114 to enforce conference settings, permissions, and controls to modify the experience for participants. (e.g., the conference administrator 302 may optimize the types of communication cue elements to include in a particular video conference (e.g., a video conference room)). The conference administrator 302 may play a role in moderating participant interactions, facilitating discussions, and addressing a technical issue that may arise during the video conference while leveraging the architecture system 200 and network 208 for connectivity and communication.

In the video conference coordination server, the conference administrator 302 may in part facilitate workshop sessions and/or breakout rooms in a video call and/or video conference. The conference administrator 302 may be responsible for various tasks, such as setting a tone, managing practicalities like invitations, overseeing technical aspects like breakout groups, presenting content in a (e.g., particular) manner, listening to contributions, being present and flexible, offering practical support and supervision, and/or creating thoughtful summaries and positive closures based on progression of a video call and/or conference. The conference administrator 302 may be part of a group of conference administrators who receive supervision and particular (administrator dedicated) communication cue elements 114.

To provide targeted support for conference administrators 302, a methodology may be provided to the conference administrators 302 that breaks down tasks and skill sets into small, practical components. This methodology may include bookends, for example, where media featuring peers as protagonists are used to support motivational intros and exits. Conference administrators 302 may be equipped with media, session designs, and tools to deliver facilitation moments lasting, for example, 3-4 minutes, making the role of the conference administrator 302 on one hand engaging for the group in the call and/or conference and on the other hand simple/practical/manageable for conference administrators who are in training to facilitate (creating a scaffolding of learning for conference administrators and participants which makes the training of new conference administrators and the delivery of successful video conferencing easily scalable).

Content may be conveyed through motivational peer videos, created with time for trust-building and reflection. The videos may provide authentic and powerful content in short formats of 1-8 minutes. The content may offer a targeted support for small groups through design, media, and peer facilitators. These motivational peer videos may follow a particular production design, such as CBE's proprietary "Authentic Fishbowl Peer (AFP) Videos Production" design, that enhances trust-building between highly diverse participants 314. The production design follows the CBE methodology and dialogue design and is supported via communication cues 114.

By integrating these components into the video conference coordination server, the conference administrator 302 may manage responsibilities and skill sets for workshop sessions within a supported, supervised community setting where they learn in small groups together with other conference administrators 302 a number of complex and interlinked skill sets (communication skills, collaboration skills, facilitation skills, self-awareness skills, motivational skills, etc.). This setting of learning in communities of practice further enhances the speed, scale and depth of learning new facilitation skills. The method allows learning these skills from experts (via media) in small groups of equal peers, which further increases the efficiency and depth of learning. The components may support an interactive peer approach, minimize costly expert teams, and modify scalability (across entire systems, nationally and globally).

The video conferencing server 316 may be responsible for processing and transmitting video and audio data between the participants. The video conferencing server 316 may include one or more servers, cloud-based resources, or a combination of these. The video conferencing server 316 may receive video and audio streams from the video conferencing clients 306, 310, and 314, process the data, and redistribute the streams to the appropriate clients to facilitate real-time communication. The server may also handle features such as screen sharing, text chat, and file sharing.

Human participants A 304, B 308, and C 312 may represent individual users engaged in the video conference. The participants may use a video conferencing client (A 306, B 310, and C 314, respectively) to access the conference. The clients may be software applications running on devices such as computers, smartphones, or tablets. The applications may capture video and audio data from the devices of the participants, send the data to the video conferencing server 316 via the network 208, and receive processed video and audio streams from the server for display on the devices of the participants.

During a video conference, the conference administrator 302 may enforce settings, permissions, and controls to optimize the conference experience. This may include moderating participant access, managing the video and audio quality, adjusting the layout of the video streams, triggering certain communication cues (before, during, after the video-conferencing based on the dialogue contributions, displayed awareness growth and witnessed skill development within the group) and enabling or disabling certain features (e.g. particular self-reflections, collaboration activities, calls to action).

The system depicted in FIG. 3 may allow for real-time communication between multiple participants in a video conference setting. By leveraging the network 208, conference administrator 302, video conferencing server 316, and video conferencing clients 306, 310, and 314, the system may provide an interactive experience for users, which may enable collaboration and communication in various scenarios such as business meetings, educational sessions, or social gatherings.

FIG. 3 illustrates an example block diagram of a video conference system, which may include an intervention dataset 318 and a video conference platform 320. The video conference platform 320 may include a pre-conference module 324, an intra-conference module 326, and a post-conference module 328. The three modules work in tandem to streamline the video conferencing experience.

The pre-conference module 324 may handle tasks such as scheduling, inviting participants, setting up standardized instruction tools 106, and configuring location assignments 112 based on the received participant data 108. The pre-conference module 324 may establish communication cue elements 114 and other settings to produce a smooth and efficient conference experience. The pre-conference module 324 may configure the intervention dataset 318, and the intervention dataset 318 may store information regarding predefined interventions or adjustments to be made during the conference.

The intra-conference module 326 may manage the video conference instance 322 during the conference. The intra-conference module 326 may handle real-time processing of video and audio feeds, enforce communication cue elements 114, and monitor participant interactions. The intra-conference module 326 may facilitate the implementation of intervention dataset 318 to cause or address adjustments that arise during the conference. The intra-conference module 326 may work with the conference administrator 302, and provide the conference administrator 302 with tools and controls to moderate the conference.

The post-conference module 328 may handle tasks, such as generating reports, analyzing participant engagement, and archiving the conference instance 322 for future reference. The post-conference module 328 may use insights gained from the conference to update the intervention dataset 318 and refine the system for future video conferences. The post-conference module 328 may facilitate the sharing of conference materials, recordings, and other relevant information with participants and other stakeholders, including conferences that are unrelated to one another and/or multiple conferences related to unrelated parties.

The video conference platform 320, with any of the three interconnected modules (pre-conference 324, intra-conference 326, and post-conference 328), may leverage the system architecture 200, network 208, and intervention dataset 318 to create a video conferencing experience. By incorporating the elements related to this technology, the video conference system may enable communication and collaboration for all participants.

Figure 4:
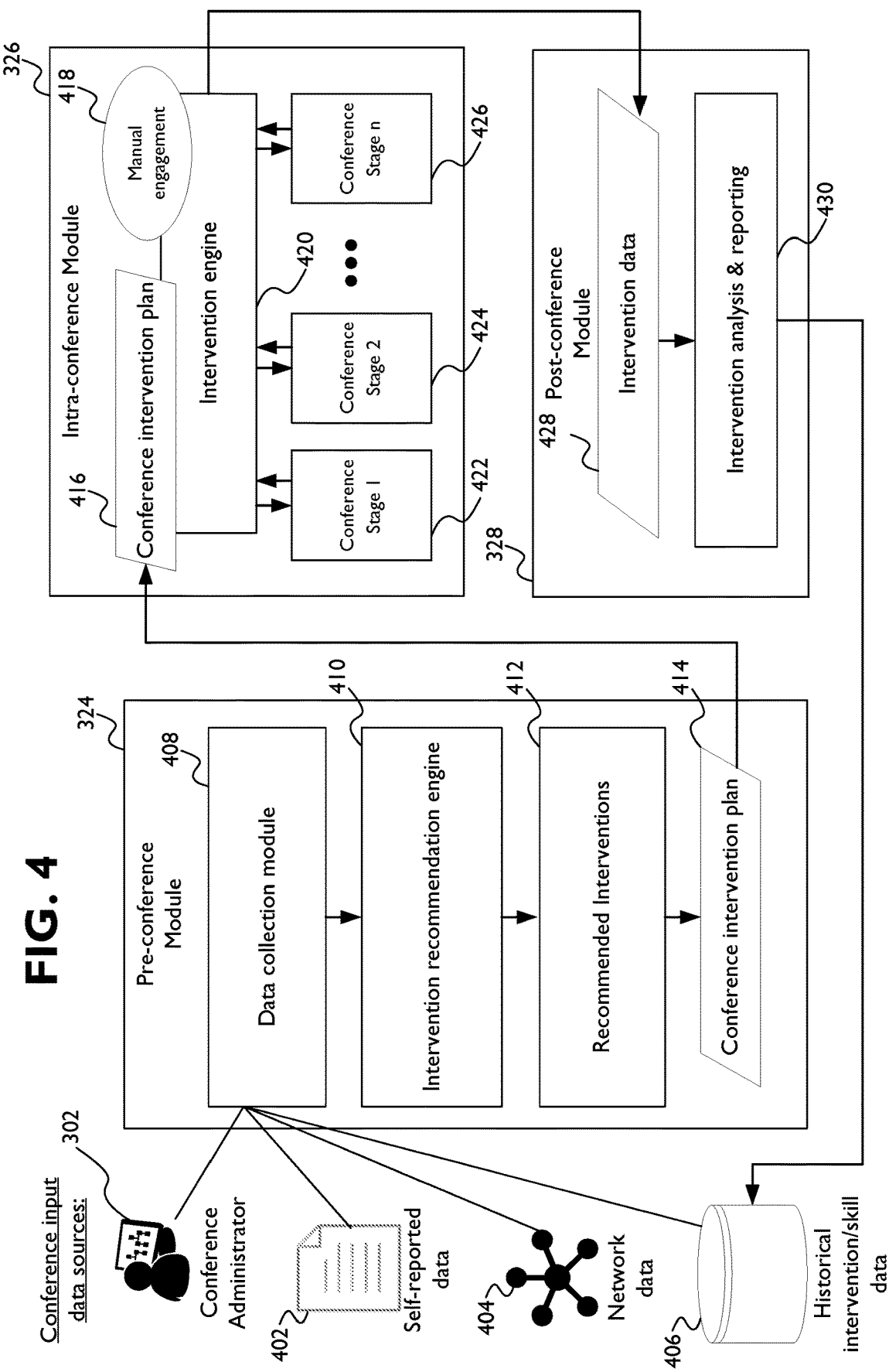
FIG. 4 is an example block diagram that includes one or more steps of processing participant data using a pre-conference module, intra-conference module, and a post-conference module.

FIG. 4 illustrates an example of components of the pre-conference module 324, including the data collection module 408. This module may receive conference input data sources from sources, such as the conference administrator 302, self-reported data 402, network data 404, and historical intervention/skill data 406. The conference administrator 302 may provide information about the conference schedule, agenda, and participant information. Self-reported data 402 may include participant preferences, skills, and background information. Network data 404 may include information about the connections between participants, while historical intervention/skill data 406 may contain records of past interventions and the skills participants have developed over time. The data collection module 408 may process and analyze the inputs to extract relevant insights and patterns (of human communication in general and of the diverse background of participants represented in each group).

After processing the input data, the pre-conference module 324 may move on to the intervention recommendation engine 410. The recommendation engine 410 may utilize algorithms and analysis methods to determine the most suitable interventions for the conference based on the collected data. The recommendation engine 410 may consider factors, such as participant roles, communication styles, and challenges that may arise during the conference. By assessing the data and taking into account the specific context of the conference, the intervention recommendation engine 410 may generate a set of recommended interventions 412 that can address the identified interventions of the video call that may modify the flow of the conference experience.

The recommended interventions 412 produced by the intervention recommendation engine 410 may include various strategies to improve communication and collaboration among participants. The interventions may range from suggesting discussion topics, assigning roles to participants, providing guidelines on communication etiquette, proposing ice-breaker activities to build rapport among participants, and/or proposing awareness practices and skill building practices to enhance participants' emotional and cognitive intelligence to track their contributions impact during interactions.

The pre-conference module 324 may compile the recommended interventions 412 into a comprehensive conference intervention plan 414. This plan may serve as a roadmap for implementing the selected interventions during the conference. It may outline the specific interventions to be executed, the timing of their implementation, and the responsibilities of the conference administrator 302 or other designated individuals in carrying out the interventions. By developing a conference intervention plan 414, the pre-conference module 324 may modify communication and collaboration among participants.

FIG. 4 illustrates the intra-conference module 326, which may handle the implementation and management of interventions during the conference. At the beginning of the conference, the conference intervention plan 416, derived from the pre-conference module 324, may provide guidance on the planned interventions. The intra-conference module 326 may use the conference intervention plan 416 to execute and monitor the interventions in real-time as the conference progresses.

The intervention engine 420, a central component of the intra-conference module 326, may be responsible for orchestrating the interventions according to the conference intervention plan 416. The intervention engine 420 may adjust interventions based on the ongoing interactions between participants and the conference context. For example, if the intervention engine 420 detects a change in the direction or pace of the conference, the intervention engine 420 may alter the intervention strategy accordingly to maintain the effectiveness of the conference. For example the intervention engine 420 may detect indicators of a misunderstanding, disconnect or conflict between participants and may intervene by introducing a reflection moment to breathe, take space, remember the diversity in the room, view a brief media prompt on effective ways to engage with misunderstanding/disconnect/conflict and then 'reassemble' the group to continue the dialogue process with enhanced awareness of self and other.

Manual engagement 418 may allow the conference administrator 302 or other designated individuals to interact with the intervention engine 420 during the conference. The conference administrator 302 or other designated individuals may provide input, request modifications to interventions, or override the recommendations of the intervention engine 420. This flexibility may enable the conference to remain adaptable to unforeseen circumstances or changes in participant dynamics.

The intra-conference module 326 may manage the different conference stages, such as conference stage 1 (422), conference stage 2 (424), and conference stage n (426). The stages may represent various phases or segments of the conference, such as introductions, presentations, group discussions, or question-and-answer sessions. The intervention engine 420 may implement tailored interventions for stages, adapting to the dynamics of the specific stage.

FIG. 4 illustrates the post-conference module 328, which may focus on analyzing and reporting the effectiveness of the interventions implemented during the conference. The post-conference module 328 may provide insights into the conference's overall success and help identify areas for improvement and inform future conference management and intervention strategies.

The post-conference module 328 may gather intervention data 428 generated during the conference. The data may include information on the interventions executed, participant responses to the interventions, and changes in participant behavior or engagement resulting from the interventions. The intervention engine 420 may collect the data throughout the conference and store the data for (e.g., subsequent) analysis in the post-conference module 328.

The intervention analysis and reporting 430 may be a component of the post-conference module 328. The intervention analysis and reporting 430 may process the intervention data 428 to assess the effectiveness of the interventions, identify trends, and evaluate the conference's overall success. The intervention analysis and reporting 430 may generate reports, visualizations, or other outputs that summarize findings for review by the conference administrator 302 or other stakeholders. The outputs may provide feedback for modifying future conference management strategies.

The intervention analysis and reporting 430 may update the historical intervention/skill data 406 with the new information gained from a recently concluded conference. The updated data may be used by the data collection module 408 (e.g., and the pre-conference module 324 for future conferences), and allow the system to learn from past experiences and continually improve its intervention recommendations and strategies.

Figure 5:
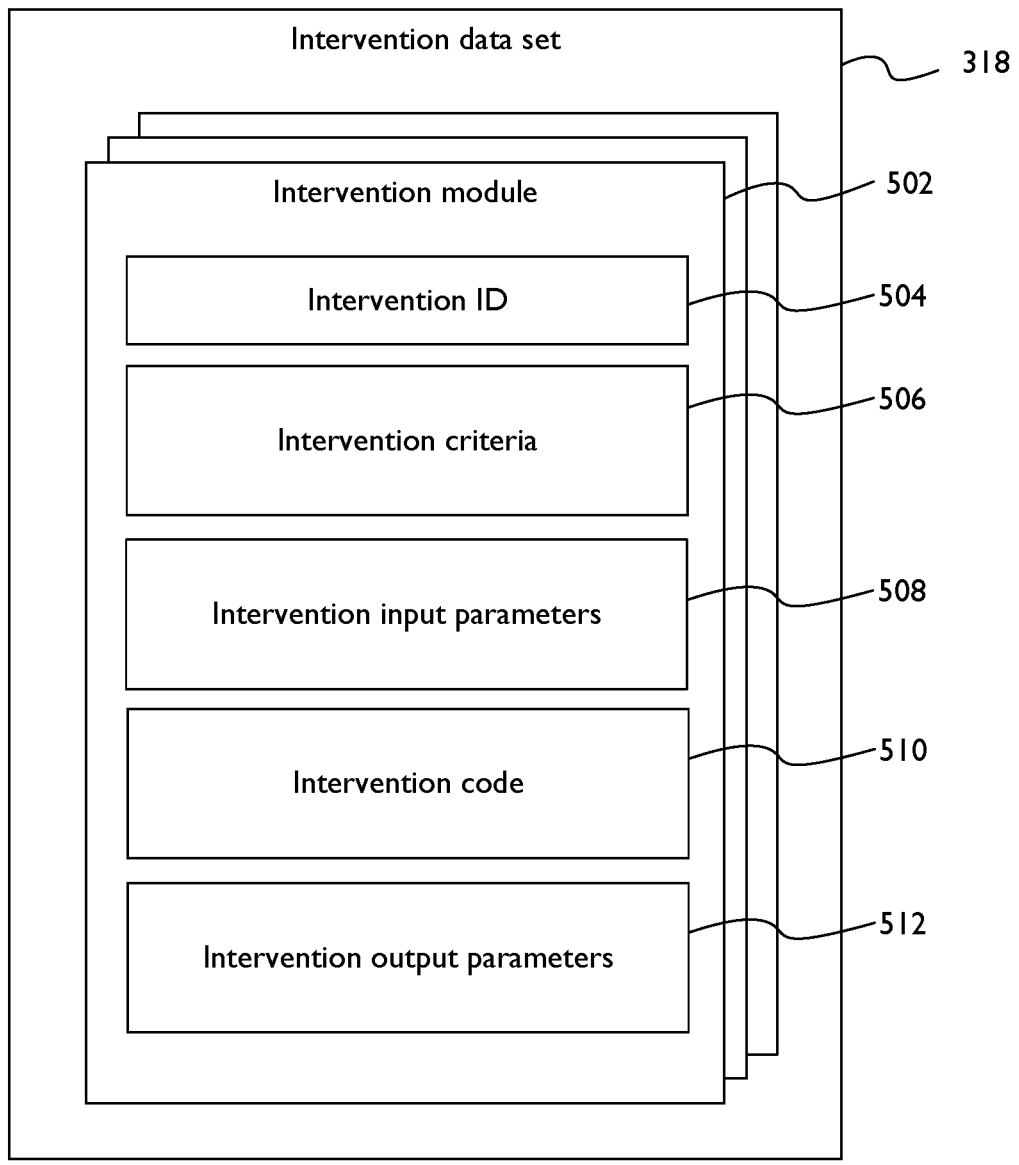
FIG. 5 is an example block diagram of an intervention data set.

FIG. 5 illustrates an example of the intervention dataset 318, which may serve as a repository for various intervention modules 502 that the system can use to facilitate the video conferencing experience. The intervention modules 502 may be designed to address specific objectives related to participant engagement, collaboration, or communication within the video conference. The intervention dataset 318 may be updated dynamically, incorporating feedback from previous conferences to improve the effectiveness of the interventions.

The intervention module 502 within the intervention dataset 318 may consist of components. The intervention ID 504 may uniquely identify an intervention module, serving as a reference to differentiate between various interventions within the dataset. The intervention ID 504 may allow the system to access, execute, and/or update specific intervention modules. The intervention ID 504 may be used by the intervention recommendation engine 410 to associate recommended interventions 412 with the appropriate intervention module.

The intervention criteria 506 may define the specific conditions or triggers that prompt the activation of the corresponding intervention module. The criteria may depend on factors such as participant behavior, conference dynamics, or other contextual information gathered during the pre-conference, intra-conference, or post-conference stages. The system may use the criteria to determine the relevance and appropriateness of each intervention module for a conference scenario. The intervention criteria 506 may be adjusted over time based on feedback from the intervention analysis and reporting 430, allowing for intervention targeting.

Intervention input parameters 508 may represent the data or information for executing an intervention module. The input parameters may be derived from sources, such as the conference administrator 302, self-reported data 402, network data 404, or historical intervention/skill data 406. By utilizing these input parameters, the intervention modules may tailor their execution to the specific context of the conference of the preferences of the participants. The input parameters may be utilized by the intervention recommendation engine 410 to prioritize interventions based on the current state of the conference.

The intervention code 510 may contain the instructions or algorithms that define the functionality and actions of an intervention module. When activated, the intervention code 510 may execute the processes to implement the intervention, using the intervention input parameters 508 as guidance to adapt its behavior to the conference context. The intervention code 510 may interact with the conference administrator 302, video conferencing clients 306, 310, and 314, or other parts of the system to enable integration of the intervention during the conference.

The intervention output parameters 512 may represent the results or effects of the intervention module's execution. The output parameters 512 may include changes in participant behavior, engagement levels, or other relevant indicators that demonstrate the impact of the intervention. The system may utilize the output parameters to inform the post-conference module 328 (e.g., the intervention analysis and reporting 430), which may assess the effectiveness of the interventions and refine future recommendations based on these outcomes. The output parameters may be used by the intra-conference module 326 to adapt the conference intervention plan 416 (e.g., in real-time), allowing for responsive and personalized interventions throughout the conference.

Figure 6:
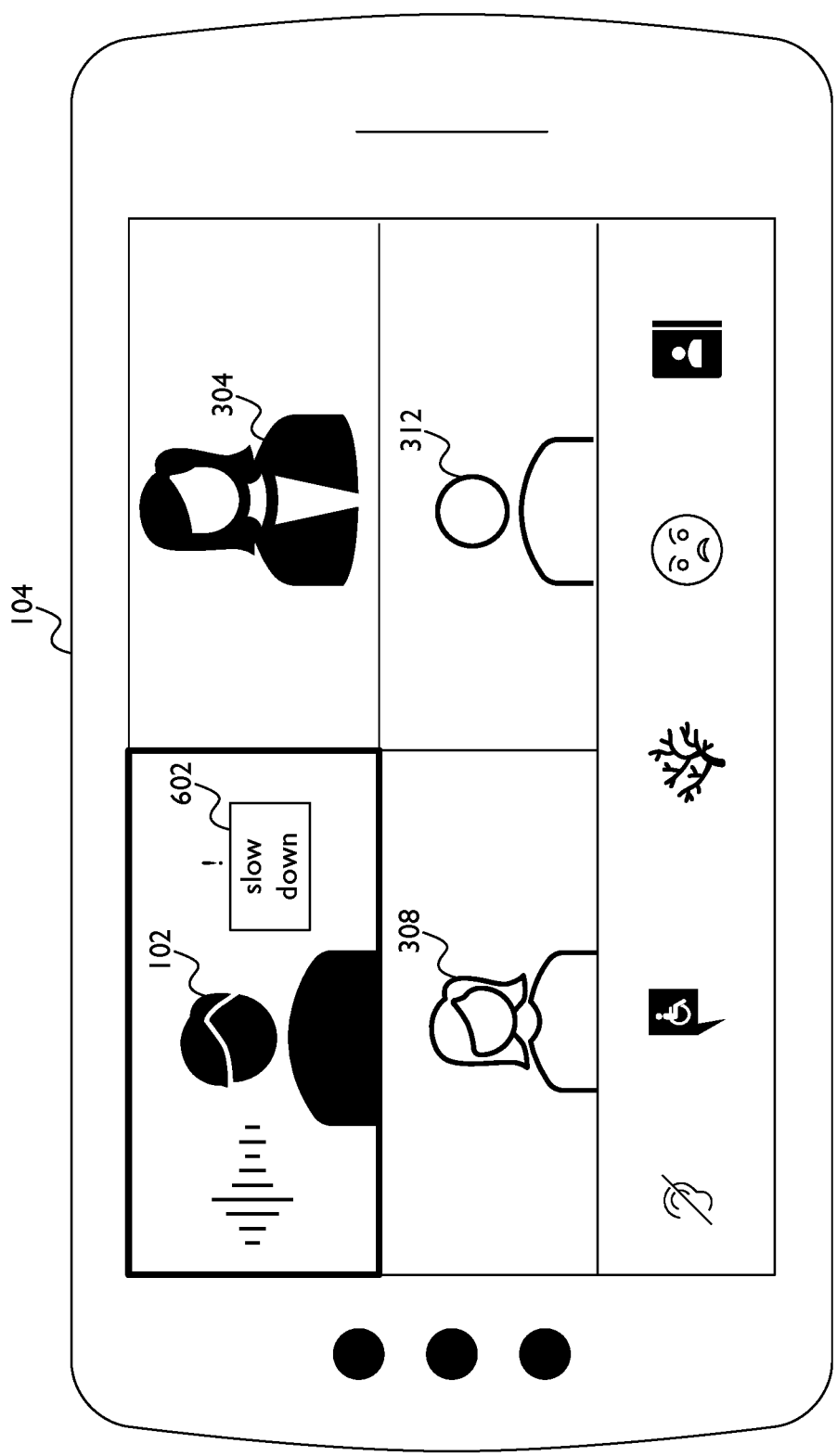
FIG. 6 depicts an example intervention output on a video conferencing client device.

FIG. 6 provides an illustrative example of a screenshot captured on the user device 104 during an active video conference. This screenshot demonstrates the integration and implementation of an intervention 602 within the video conference environment, showcasing how the system may interact with the user 102 and the other human participants (A, B, and C) to modify communication and engagement during the conference.

In an example, the intervention 602 may be a prompt advising the user 102 to slow down. The intervention may have been triggered based on a variety of factors such as the type of conference room, the pace of the user's speech, participant feedback, conference coordinator feedback, data of other participants who are non-native English speakers or other contextual data. The intervention criteria 506 and input parameters 508, in combination with the conference input data sources (e.g., conference administrator 302, self-reported data 402, network data 404, and historical intervention/skill data 406), may have informed the system that the pace of user 102 does not match the current conference context.

The intervention 602 may have been selected from the intervention dataset 318 by the intervention recommendation engine 410 during the pre-conference module 324, and incorporated into the conference intervention plan 414. During the intra-conference module 326, the intervention engine 420 may have monitored the conference's progress and activated the intervention 602 when the appropriate conditions were met.

Machine learning, as it may relate to this invention, may play a role in modifying the video conference experience for participants. For example, supervised learning techniques may be used to predict and recommend interventions based on historical data and user feedback. Regression analysis, such as linear or polynomial regression, may help identify patterns in participant engagement and satisfaction, allowing the system, such as the intervention recommendation engine 410, to understand interventions that are effective in (e.g., specific) situations. Decision trees and random forests may be employed to analyze and classify different types of video conferences, helping the intervention recommendation engine 410 to determine the most suitable interventions for each scenario.

Classification algorithms, such as K-Nearest Neighbors (KNN), logistic regression, Naïve Bayes, or Support Vector Machines (SVM), may be utilized to classify participant behavior or conference characteristics, which may assist the system in tailoring interventions to specific situations. In examples, the system may use the classification algorithms to identify participant roles, the nature of the conference, or the level of engagement among participants, and subsequently recommend interventions that may be most effective in addressing the conference, such as the interventions shown in intervention dataset 318.

Unsupervised learning techniques, such as clustering or dimensionality reduction methods like Singular Value Decomposition (SVD) and Principal Component Analysis (PCA), may be employed to uncover hidden patterns or structures in the data. For example, clustering algorithms like K-means may be used to group similar conferences together, which may aid the system, such as the data collection module 408, in understanding the underlying relationships between different types of video conferences and their respective properties (e.g., requirements). Association analysis techniques, such as the Apriori algorithm or the FP-growth algorithm, may be applied to discover patterns and associations among interventions, participant behaviors, and conference characteristics, enabling the system to make (e.g., accurate) intervention recommendations.

Reinforcement learning may be incorporated into the invention to enable the system to learn and adapt its recommendations over time based on feedback from the video conferences. By utilizing techniques such as Q-learning or Deep Q-Networks, the system, such as the intervention engine 420, may learn to make decisions about which interventions to suggest, by observing the consequences of its past recommendations and adjusting its strategies accordingly. The dynamic learning process may enable the system to continually improve its recommendations, leading to a tailored video conference experience for all participants.

The intervention 602 may be designed to adapt to the specific conference environment and the needs of the participants. For instance, the prompt may be displayed in the user's preferred language or adjusted in size and position based on the user device 104's display configuration or ability of the user 102 to read the prompt. The intervention 602 may consider the communication preferences of the other human participants (A, B, and C) and modify the content, tone, or timing of the prompt accordingly.

In order to implement communication interventions throughout the virtual communication process of participants, a Virtual Dialogue Console ("VDC") may be provided. The VDC, which is described in detail below, may offer communication impulses based on the collected data and understanding of perception sources, interpersonal factors, human condition factors, and online communication factors.

The implementation of the intervention 602 may have immediate and long-term effects on the conference experience. In the short term, the user 102 may raise awareness of their speed, experience respect and empathy for non-native English speakers, adjust their speaking pace, establish caring feedback loops to ensure their paste of speaking is understandable, potentially significantly improving the communication and comprehension among the participants. In the long term, the intervention output parameters 512, which may include the response of the user to the prompt and the overall conference outcomes, may be analyzed during the post-conference module 328. The intervention analysis and reporting 430 may use the insights to refine the intervention criteria 506 and input parameters 508.

The specific intervention 602 depicted in FIG. 6 is one example of the possible interventions that the system may implement during a video conference. Other interventions may address various aspects of the conference, such as participants' intentionality, openness, awareness of self (e.g. own skill levels, biases), awareness of other (e.g. cultural backgrounds and perceptions), engagement, collaboration, or technical issues, and may be customized to fit the unique needs and preferences of the user 102 and the other human participants (A, B, and C).

One possible intervention that the system may employ during a video conference is encouraging participants to actively listen, empathize and engage with the speaker. For instance, if the system detects that a participant's attention is waning, it could display a prompt reminding them to intentionally invest respectful focus on the speaker, mirror what they said or ask a question that deepens the interaction. The system may determine the need for this intervention based on participant feedback, conference coordinator feedback, eye-tracking data, or self-reported engagement levels. This intervention may involve the use of the intervention dataset 318 and the intervention engine 420 to monitor participant behavior and adapt the conference accordingly.

In examples, a, intervention offered by the system may be real-time language translation services to participants who speak different languages. When a need for translation is detected, the system may display subtitles or provide an audio translation in the preferred language of a participant. The intervention may be triggered by participant language preferences, speech-to-text analysis, or other linguistic cues. The intervention recommendation engine 410 may identify the need for this intervention and adjust the conference intervention plan 414 to determine that (e.g., all) participants can understand the content effectively. The intervention may automatically trigger a reminder to all other participants to 'slow down' in order to respect the non-native speaker and in order to ensure an accurate/effective usage of the real-time language translation service.

The system may assist participants in resolving technical issues that arise during the conference as an intervention. For example, if a participant experiences a poor internet connection or audio/video quality issues, the system may provide troubleshooting tips or automatically adjust the settings to improve performance. The intervention may be activated by monitoring network data, participant feedback, or self-reported technical difficulties. The intervention may use information from the conference input data sources, including network data 404 and conference administrator input 302, to identify technical challenges and recommend solutions.

Enhancing collaboration among participants may be an intervention that the system suggests. For example, the intervention may display prompts encouraging participants to share their thoughts or utilize a virtual whiteboard to visually express ideas. The intervention may be triggered based on the conference's agenda, participant roles, or past collaboration patterns. The intervention recommendation engine 410 and the intervention engine 420 may work together to identify opportunities for improved collaboration and adjust the conference intervention plan 416 accordingly.

The system may recommend breaks or brief practices (movement, stretching, breathing) during long conferences to help maintain participant focus and well-being. The intervention may monitor the duration of the conference, participant engagement levels, or self-reported fatigue to determine when a break is necessary. The system may suggest a suitable break duration and notify the participants accordingly. The pre-conference module 324, with its data collection module 408, may gather relevant information about the participants and their preferences, allowing the system to make well-informed decisions about break recommendations.

The examples described herein illustrate a range of interventions the system may offer during a video conference to address various aspects of communication, engagement, and participant well-being. By analyzing data sources and considering participant preferences, the system may tailor interventions to the unique needs of each conference and its participants.

Figure 7A:
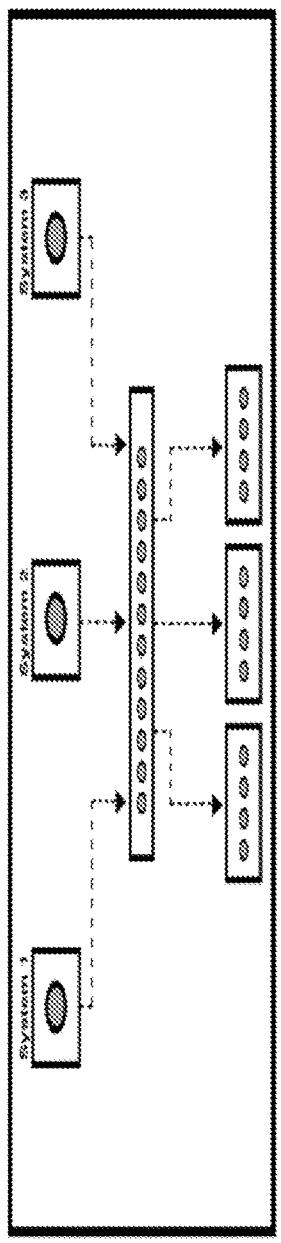
FIG. 7A is an example flowchart of communication between participants and/or participant devices.

FIG. 7A illustrates the flow of information between two users during a video conference, highlighting the various stages involved in the communication process. The first user's brain may generate the motivation for communication, which may subsequently lead to the composition of the message. Once the message is composed, the message may be transmitted through the video conference platform, such as the video conference instance 322. This transmission may involve the use of audio, video, or other multimedia elements, as well as encoding and compression techniques to ensure efficient data transfer. The second user may receive the transmitted message through their video conferencing client, such as video conferencing client A 306, video conferencing client B 310, or video conferencing client C 314, and processes it, ultimately leading to the interpretation of the message.

The communication process depicted in FIG. 7A may be closely related to the various elements described in the detailed description, as the effectiveness of this process may influence the overall video conference experience for all participants. The intervention recommendation engine 410 and intervention engine 420 may play significant roles in optimizing the communication flow between users by suggesting and implementing interventions designed to enhance the clarity, efficiency, and overall quality of the exchanged messages. For example, interventions may be aimed at adjusting the audio and video quality, raising awareness for the diversity of participants' backgrounds (e.g. usage of different languages; cultural differences in the interpretation of terminology, gestures, symbols, emotions, etc.), facilitating comprehension of the shared content (e.g. their intrinsic logic, complexity, meaning based on their underlying starting points, interpretations, perceptions), or promoting collaboration among participants. By adjusting parameters and creating interventions that maintain the flow of clear, effective information between users, the system may modify (e.g., enhance) the video conference experience, leading to increased understanding, satisfaction and productivity for all participants.

Figure 7B:
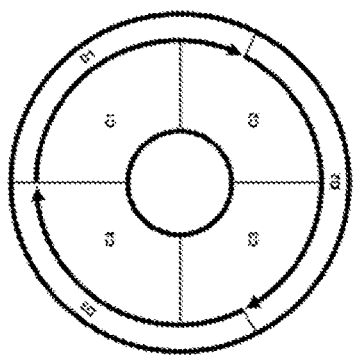
FIG. 7B is an example flowchart for processing data associated with a video conference (e.g., communication skills, communication choices, and online communication parameters).
Figure 7B:
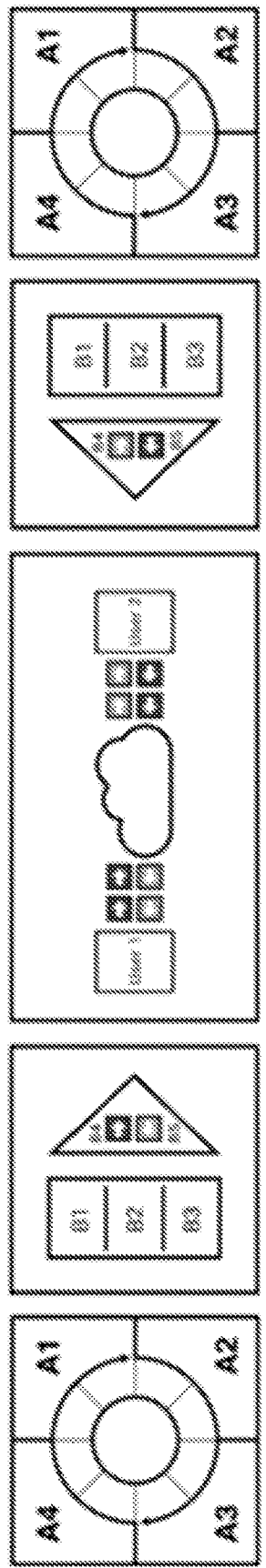

FIG. 7B illustrates a potential approach to video conferencing that may adjust the communication process by addressing human and technological communication. This approach may employ, for example, the following measures: pre-dialogue design, virtual dialogue design, and an online communication app, which may interact with various components described in the detailed description, such as user device 104, conference module 300, and the intervention dataset 318.

Pre-dialogue design may help prepare participants for the online communication process by promoting communication skills development and conscious communication choices. This development stage may include understanding perception sources, interpersonal factors, human condition factors, and online communication factors, which may interact with the intervention criteria 506 and intervention input parameters 508.

Virtual dialogue design may support the encoding and decoding of information during the online communication process by utilizing various strategies that may interact with the intervention code 510 and the intervention output parameters 512. The strategies may include intentional, media-enhanced preparations of dialogue participants; peer leadership trainings and peer supervision; and a scaffolding of facilitation tools that enhance and guide: constructive group dynamics, transformative learning interventions, intentional design, and guidance for peer community building, fostering relationship building, skills development, behavior change, individual and collective action.

The online communication app may provide support throughout the communication process, interacting with elements, such as user device 104 and conference module 300. The app may incorporate interactive tools to assist users in navigating the complexities of interlinking human communication and technology. The app may support intentional diversity registration, virtual events platforms, a design (e.g., a digital village design), participatory culture tools, and artificial intelligence nudges, possibly utilizing various machine learning techniques, as discussed earlier, to adjust awareness of communication complexities.

Figure 8:
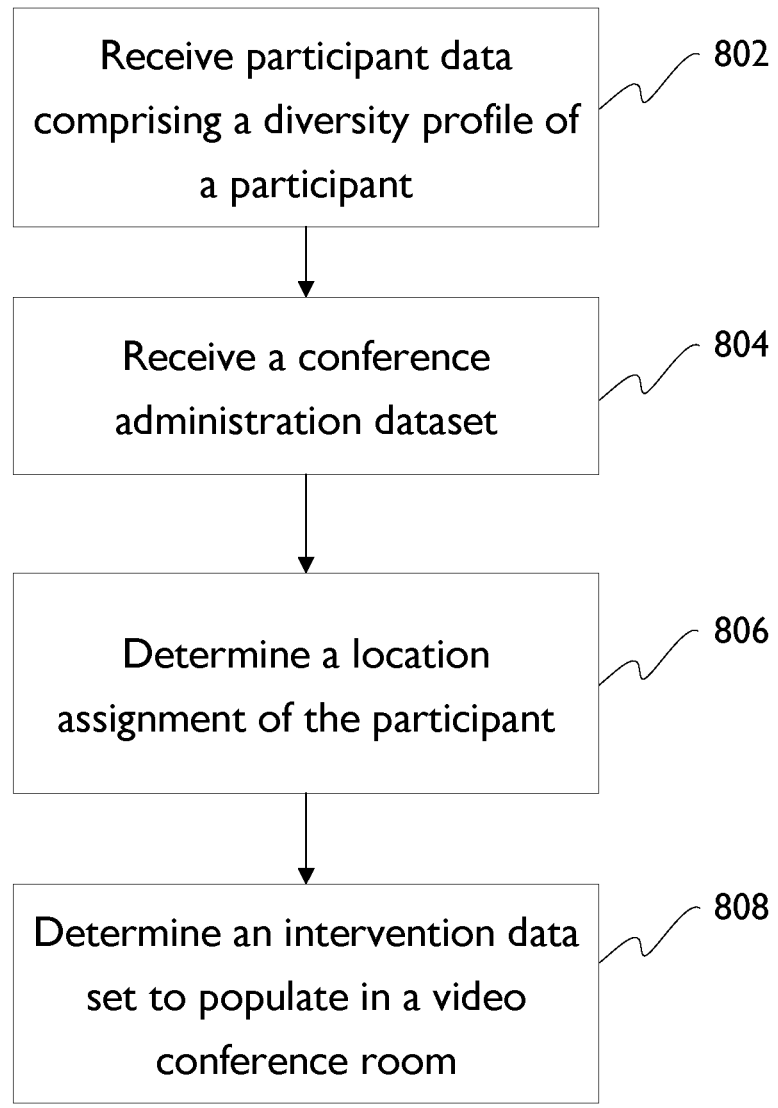
FIG. 8 is a flowchart of an example method for facilitating a video conference.

FIG. 8 depicts an example method for facilitating a video conference. At 802, a video conference coordination server may receive participant data from a participant device, and the participant data may include a diversity profile of a participant. The diversity profile of the participant may be calibrated based on one or more of a communication threshold or a communication practice list. At 804, the video conference coordination server may receive a conference administration dataset. At 806, the video conference coordination server may determine a location assignment of the participant based on one or more of the received participant data and the conference administration dataset. At 808, the video conference coordination server may determine an intervention data set to populate in a video conference room including at least the participant based on the location assignment, participant data, and the conference administration dataset.

The video conference coordination server may determine the location assignment of the participant based on the diversity profile of the participant, which may include aspects such as the cultural background of the participant, language proficiency, communication style, or interpersonal factors. The determination may take into account the received participant data and the conference administration dataset.

Calibrating the diversity profile of the participant in the video conference coordination server may include determining the ability of the participant to understand and respond to communication in the video conference. The video conference coordination server may receive multiple group communication thresholds corresponding to a group of participants and compare the communication threshold of the participant with the group communication thresholds. The processor may determine that the communication threshold of the participant falls within a predetermined range relative to the group communication thresholds, indicating compatibility within the group of participants.

The video conference coordination server may receive the conference administration dataset, which may include configuration data corresponding to the video conference or conference administrator data corresponding to a conference administrator of the video conference. The video conference coordination server may determine the location assignment by assigning the participant to a specific workshop group and a specific breakout room within the video conference based on the diversity profile of the participant or the conference administration dataset. In an example, the data will help in deciding which participants enter a workshop group of, say, twelve participants, and which will then go into, say, three breakout rooms of, say, four participants each.

The conference administration dataset may include group preferences, group communication goals, or group interaction rules. The video conference coordination server may determine the location assignment of the participant based on the diversity profile of the participant in relation to any of the group preferences, group communication goals, or group interaction rules.

The video conference coordination server may determine the intervention data set by generating prompts, recommendations, or feedback, which may be based on the location assignment, participant data, and the conference administration dataset. The interventions may be used to enhance group cohesion, trust building, effective communication, engagement and collaboration within the video conference environment.

The data of the diversity profile of the participant will also trigger the communication impulses for the preparation process that happens prior to each video conference interaction. Participants make pre-dialogue choices (values, intentions, etc.) prior to the video conference based on the preparations, which raise in them awareness for self (e.g. own potential biases) and other (e.g. cultural and personal backgrounds of others in their group). Additional to the diversity profile the trigger of the communication impulses respond also to the specific role of each person (roles: conference administrator, tech host small group facilitators, participant) in order to provide role and task specific communication instructions.

An example Virtual Dialogue Console will now be described. Participants may complete a pre-dialogue self-reflection process in which participants make Pre-Communication Choices which can then be highlighted for them on the Virtual Dialogue Console as "Goals." Participants may make at the beginning of a dialogue two Skill Choices that they aim to focus on during the communication process. The Goals combined with Skill Choices can then trigger Communication Impulses throughout the entire communication process (e.g., during small group dialogues a communication impulse may be: "Remember: you did choose to focus especially on active listening today.")

The Virtual Video Display may be reduced to the top center of the PC screen (i.e., large enough to see four participants well, small enough to create space for the VDC console features). As side effect of this might be that the participants look in the direction of the camera of the laptop/creating an impression of better eye contact.

In the center of the Participant Video Display, a round space opens up (at times) in order to create the space for symbols to appear that indicate a certain communication intervention (e.g. a turning RUBIK'S CUBE appears to indicate to the speaker that their time has passed and that it is time to hand over to another person. This can be accompanied by the communication impulse: 'Pass the cube to create the space to see another side/color.') The Symbol Compass can provide a guidance on the different symbols that show up. (Initially a design of pre-scheduled symbols to appear/In the future AI and participants themselves may trigger symbols to appear).

The Emotion Wheel is a self-awareness tool that support individual participants to track the emotions and feelings they experience prior, during and after a session (starting initially with self-reporting—yet in future AI supported). Participants are asked three times throughout a session to self-assess their emotions which will trigger additional Communication Impulses (e.g. 'Remember that you were in the last session quite upset about participant B. How could that potentially effect how you are interpreting their contributions today?')

The Process Map tracks once personal self-assessments and development of skills over a period of several sessions, supporting participants by tracking: pre-session choices of challenges and skills, session focuses, goals, and intentions; and a post-survey link, for example. Outcome mapping indicates the learnings of each session, generating an overview of multiple sessions over time.

The Dialogue Timer provides clarity of the length of time small groups have in breakout rooms/the length of time each small group participant can share (e.g. 4 participants 2 min each creates an 8 min breakout room).

The Outcomes highlight at the end of a session for the participants in what areas they have grown skills (self-reflections, AI tracking of participants' communication contributions in the future)

Communication elements are only visible between dialogue activities and are darkened while dialogues are in progress (1. to support intentionality, concentration, focus, mindfulness & 2. to avoid distractions). Participants' Video Windows: may darken a little 1. when a symbol appears in the center and 2. During Self-Awareness Moments (between activities). Using collected data for supporting participants to communicate effectively by translating the data into communication impulses (in future AI enhanced). Reports (Pre- and Post-) generate multiple interventions: Self-Report Process; Temperature Chart shows emotions; Process Map shows practiced skills; Skills Responses maps how you responded within the session; Skills Needs makes suggestions for next intervention; Encouragement provides supportive, nurturing comments on the process; Reflections provides writing prompts. Suggestions for Simple Next Steps may be at the end of each session. A Digital Village map may provide an overview of next dialogue events. Participatory Culture suggestions: providing inspiration, motivation and modelling of simple media messages that participants can generate for people in their small groups.

Authentic Fishbowl Peer (AFP) Videos Production will now be described. This may seem like a very simple straight forward component of 'simply' using some video prompts as conversation starters (which is used widely in virtual events). Yet, this element is actually at the heart of the effectiveness of the CBE method and communication interventions in order to create the significant impact that participants experience during our programs.

The CBE approach to AFP video production is unique in its way of recording peers. The CBE method interlinks the following learning approaches and methodologies for skills development.

Learning Approaches: Peer Learning (effective learning not through a detached, authority expert but through a connected, equal peer); Social Learning (learning through witnessing each other); Diversity Learning (intentional learning from differences—as we humans perceive through contrast); Transformative Learning (perspective change through authentic interaction).

Skills Development Methodologies: Fishbowl Dialogue Method (building trust in a small group, that is witnessed in a large group—with the aim to process it in many small groups); Intercultural Communication (e.g. awareness skills to detect the invisible Aspects of Culture and respond to it with concrete communication interventions/practices); The Art of Film Making: showcasing very intimate, personal interactions (to trigger emotions), while assembling them in edits that make human patterns visible (to trigger deeper understanding) (Note: additional content of this section is in the appendix at the end of this document).

The production of AFP videos follows a time intensive, culturally diverse, emotionally sensitive and personally engaging process. The production process is not predominantly on 'correctness of content' (participants saying the 'right thing') but on 'authenticity of process' (participants showing with integrity where there are at in their development process).

The CBE method is built into the design of AFP video productions. The AFP Video Production will be scaled via the CBE method and the Intelligence Enhanced Video Conferencing. It will be scaled through technology in two stages: Automated Production Process of AFP Videos (via pre-programmed production interventions on the CBE virtual communication platform); AI enhanced Production Process of AFP Videos (via AI production interventions on the CBE virtual communication platform).

The production process will be build on the CBE virtual communication platform into a process of 'Participatory Culture' in which peer participants take creative agency in the production process. This enables to adapt the AFP video content to very different target groups (e.g. adapting the same topic focus to very different cultural backgrounds by peers editing AFP videos for their own cultural groups).

The Automated Production Process of AFP Videos includes following steps: Intentional Diversity Design: via data of our registration process we will identify 4-6 fishbowl participants of diverse cultural backgrounds that each provide highly distinct perspectives on the specific program topics that are in production (e.g. cultural differences, gender, race, social issues, etc.). Training Editing Skills: training program participants in video production skills and their capacity to use video production tools on the CBE virtual platform. Virtual Toolkit and Support: providing access to CBE online tools and virtual supervision for the video production process. CBE Design: applying the CBE method and 'Intelligence Enhanced Virtual Conferencing' to the AFP video production process. Authenticity Process: Facilitating an interactive CBE pre-program between participants to build trust within the group and develop dialogue skills (which will be the basis for an 'authentic process'). Fishbowl Recordings: Facilitate a series of approx. 3-9 session recordings to bring the specific production content alive by representing them from different perceptions of the diverse participants.

Rough Cut Process: Via surveys and in-person feedback, collecting the insights of fishbowl facilitators and program participants of their view on the strongest moments of the group process. Trained peers selecting the 'moments of gold' of the peer interactions with the help of a virtual video editing tool. Trained peers editing rough cuts of initial video selections and interweaving them into 'diversity collages' that support the visibility of the 'wisdom of the crowd' (collective intelligence that is only emerging by interlinking different—sometimes opposing—viewpoints). Trained peer facilitators piloting the rough cuts with three Peer Focus Groups of different cultures and collecting their feedback of what resonates with them.

Re-Editing 'Authentic Fishbowl Peer Videos': Trained peers incorporating the feedback of the Peer Focus Groups in the video edits. Trained peers adding external media, graphics, expert contents and video excerpts to the video edits.

Piloting: Trained peer facilitators piloting AFP Videos with 5-10 workshop groups and collecting feedback of personal impact via the 'Intelligence Enhanced Virtual Conferencing' platform, assessments, surveys. Final Cut Edits: Trained peers creating the final cuts of the AFP Video edits.

Program Implementation: CBE staff incorporating the AFP Videos to CBE programs: Building the AFP Videos into the design of CBE's Signature Workshops; Making the AFP Videos widely available on the CBE Virtual Events platform; Editing excerpts of the AFP Videos for the CBE Social Media outreach.

This automated approach of 'Participatory Culture' generates the following benefits: Peers change from being passive observers into active participants; Participants learn team work, collaboration skills, communication skills; Participants enter safe space for personal development; Participants enter engaging space for developing creativity and a sense of purpose; CBE programs become more and more refined for highly different target groups; Participants experience personal validation and agency of community building; Social media changes from the devastating mental health effects of social comparison to networking and relationship building.

All aspects of the AFP Video production that are described above will be in the future enhanced via AI interventions.

The Art of Film Making: The CBE dialogue methodology combined with the technical infrastructure is designed to respond to the core global crises of our time (e.g. polarization, division, isolation, an epidemic of mental health issues, apathy in the face of social issues such as the climate crisis). The CBE method is brought alive through the art of filmmaking in order to: Support Mental Health: validate young peoples voices, insights, stories and respond to the emotionally traumatizing effects of social media (e.g. isolation, social comparison, etc.); Flip the hierarchy of learning: empower participants to be the agents of their learning process; support teachers in their capacities to flip roles (from presenter to facilitator/from 'sage on stage' to 'supportive mentor'); Support transformative learning: in film we can experience 'emotional time travel' as we can review the key moments of a person's life story within an hour. This can be applied to the learning process too, by making peers into the protagonists.

The invention claimed is:

1. A video conference coordination server, the server comprising a processor configured to:
   receive respective participant data from each of a plurality of participant devices, wherein the participant data comprises a respective participant-provided diversity profile for each of a plurality of participants, wherein each of the respective diversity profiles provides demographic information about the respective participant, and wherein each of the diversity profiles is calibrated based on one or more of a communication threshold or a communication practice list;
   receive a conference administration dataset;
   determine a respective location assignment of each of the participants based on one or more of the received participant data and the conference administration dataset;
   determine an intervention data set to populate in a video conference room, wherein the video conference room includes a subset of the plurality of participants, wherein the subset of the plurality of participants is chosen from among the plurality of participants based on the respective diversity profiles provided by the plurality of participants, and wherein the intervention data set is based on the conference administration dataset and on the location assignments and participant data associated with the subset of the plurality of participants;
   determine a suitable intervention for the video conference based on the intervention data set, wherein the intervention is determined, based on the respective diversity profiles of the subset of participants, so as to improve communication between the subset of participants in the video conference room; and
   provide a visual indicator of the determined intervention to at least one of the subset of participants in the video conference room during the video conference, wherein the at least one of the subset of participants is selected based on the respective diversity profile provided by the at least one participant, wherein the visual indicator of the determined intervention is selected specifically for the at least one participant from among a set of interventions based on the diversity profile provided by the at least one participant, and
wherein the determined intervention includes a peer video, wherein the peer video is selected specifically for the selected participant from among a set of peer videos and is configured to model the determined intervention, and wherein the peer video includes modeling of the determined intervention by a peer of the participants.

2. The video conference coordination server of claim 1, wherein determining the location assignments of the respective participants is further based on the diversity profiles of the participants, and wherein when considering the diversity profiles of the participants, the processor is further configured to:
determine at least one of the following: a cultural background, a language proficiency, a communication style, or an interpersonal factor of the respective participant.

3. The video conference coordination server of claim 1, wherein calibrating the diversity profiles of the participants based on the communication threshold comprises determining an ability of the participant to understand and respond to communication in the video conference, and wherein when determining the ability of the participant to understand and respond to communication in the video conference, the processor is further configured to:
receive a plurality of group communication thresholds corresponding to a group of participants; and
based on the plurality of group communication thresholds, determine that the communication threshold of the participant is within a predetermined range relative to the plurality group communication thresholds, wherein the predetermined range indicates a compatibility of the participant within the group of participants.

4. The video conference coordination server of claim 1, wherein receiving the conference administration dataset comprises obtaining at least one of: configuration data corresponding to the video conference or conference administrator data corresponding to a conference administrator of the video conference.

5. The video conference coordination server of claim 1, wherein determining the location assignment comprises assigning the participant to at least one of a specific workshop group and a breakout room based on at least one of the diversity profile of the participant or the conference administration dataset.

6. The video conference coordination server of claim 1, wherein the conference administration dataset comprises at least one of: group preferences, group communication goals, or group interaction rules, and wherein the processor is further configured to:
determine the location assignment of the participant based on the diversity profile of the participant in relation to any of the group preferences, group communication goals, or group interaction rules.

7. The video conference coordination server of claim 1, wherein determining the intervention data set includes generating at least one of the following: prompts, recommendations, or feedback, and wherein the prompts, recommendations, or feedback are based on the location assignment, participant data, and the conference administration dataset.

8. A method for a video conference coordination server, the method comprising:
receiving respective participant data from each of a plurality of participant devices, wherein the participant data comprises a respective participant-provided diversity profile for each of a plurality of participants, wherein each of the respective diversity profiles provides demographic information about the respective participant, and wherein each of the diversity profiles is calibrated based on one or more of a communication threshold or a communication practice list;
receiving a conference administration dataset;
determining a respective location assignment of each of the participants based on one or more of the received participant data and the conference administration dataset;
determining an intervention data set to populate in a video conference room, wherein the video conference room includes a subset of the plurality of participants, wherein the subset of the plurality of participants is chosen from among the plurality of participants based on the respective diversity profiles provided by the plurality of participants, and wherein the intervention data set is based on the conference administration dataset and on the location assignments and participant data associated with the subset of the plurality of participants;
determining a suitable intervention for the video conference based on the intervention data set, wherein the intervention is determined, based on the respective diversity profiles of the subset of participants, so as to improve communication between the subset of participants in the video conference room; and
providing a visual indicator of the determined intervention to at least one of the subset of participants in the video conference room during the video conference, wherein the at least one of the subset of participants is selected based on the respective diversity profile provided by the at least one participant,
wherein the visual indicator of the determined intervention is selected specifically for the at least one participant from among a set of interventions based on the diversity profile provided by the at least one participant, and
wherein the determined intervention includes a peer video, wherein the peer video is selected specifically for the selected participant from among a set of peer videos and is configured to model the determined intervention, and wherein the peer video includes modeling of the determined intervention by a peer of the participants.

9. The method of claim 8, wherein determining the location assignments of the respective participants is further based on the diversity profiles of the participants, and wherein when considering the diversity profiles of the participants, the method further comprises:
determining at least one of the following: a cultural background, a language proficiency, a communication style, or an interpersonal factor of the respective participant.

10. The method of claim 8, wherein calibrating the diversity profiles of the participants based on the communication threshold comprises determining an ability of the participant to understand and respond to communication in the video conference, and wherein when determining the ability of the participant to understand and respond to communication in the video conference, the method further comprises:

receiving a plurality of group communication thresholds corresponding to a group of participants; and based on the plurality of group communication thresholds, determining that the communication threshold of the participant is within a predetermined range relative to the plurality of group communication thresholds, wherein the predetermined range indicates a compatibility of the participant within the group of participants.

11. The method of claim 8, wherein receiving the conference administration dataset comprises obtaining at least one of: configuration data corresponding to the video conference or conference administrator data corresponding to a conference administrator of the video conference.

12. The method of claim 8, wherein determining the location assignment comprises assigning the participant to at least one of a specific workshop group and a breakout room within the video conference based on at least one of the diversity profile of the participant or the conference administration dataset.

13. The method of claim 8, wherein the conference administration dataset comprises at least one of: group preferences, group communication goals, or group interaction rules, and wherein the method further comprises:

determining the location assignment of the participant based on the diversity profile of the participant in relation to at least one of the group preferences, group communication goals, or group interaction rules.

14. The method of claim 8, wherein determining the intervention data set includes generating at least one of the following: prompts, pre-workshop preparations, communication impulses, recommendations, post-workshop reflections, assessments, integration activities or feedback, and wherein the prompts, recommendations, or feedback are based on the location assignment, participant data, and the conference administration dataset.

\* \* \* \* \*

UNITED STATES PATENT AND TRADEMARK OFFICE
CERTIFICATE OF CORRECTION

| | |
|---|---|
| PATENT NO. | : 12,425,469 B2 |
| APPLICATION NO. | : 18/140836 |
| DATED | : September 23, 2025 |
| INVENTOR(S) | : Arnd Wächter |

Page 1 of 1

It is certified that error appears in the above-identified patent and that said Letters Patent is hereby corrected as shown below:

On the Title Page

Item (12) United States Patent: delete "Wáchter" and insert: --Wächter--

Item (71) Applicant: delete "Wáchter" and insert: --Wächter--

Item (72) Inventor: delete "Wáchter" and insert: --Wächter--

Signed and Sealed this
Ninth Day of December, 2025

John A. Squires
*Director of the United States Patent and Trademark Office*